US010450051B2

(12) United States Patent
Gat et al.

(10) Patent No.: US 10,450,051 B2
(45) Date of Patent: Oct. 22, 2019

(54) SOLID-LIQUID COMPOSITE STRUCTURES

(71) Applicant: TECHNION RESEARCH & DEVELOPMENT FOUNDATION LIMITED, Haifa (IL)

(72) Inventors: Amir Gat, Kfar Yona (IL); Shai Elbaz, Haifa (IL); Yoav Matia, Netanya (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 333 days.

(21) Appl. No.: 15/528,109

(22) PCT Filed: Nov. 19, 2015

(86) PCT No.: PCT/IL2015/051117
§ 371 (c)(1),
(2) Date: May 19, 2017

(87) PCT Pub. No.: WO2016/079743
PCT Pub. Date: May 26, 2016

(65) Prior Publication Data
US 2017/0320559 A1 Nov. 9, 2017

(30) Foreign Application Priority Data
Nov. 20, 2014 (GB) .................................. 1420644.5

(51) Int. Cl.
*B64C 3/38* (2006.01)
*B64C 3/18* (2006.01)
(Continued)

(52) U.S. Cl.
CPC ................ *B64C 3/185* (2013.01); *B64C 1/34* (2013.01); *B64C 3/38* (2013.01); *B29L 2031/3085* (2013.01)

(58) Field of Classification Search
CPC ....... B64C 3/52; B64C 3/38; B64C 2003/445; B29L 2031/3085
See application file for complete search history.

(56) References Cited

U.S. PATENT DOCUMENTS 3,118,639 A * 1/1964 Kiceniuk ................. B63H 1/26
114/162
3,443,776 A 5/1969 Moore
(Continued)

FOREIGN PATENT DOCUMENTS

FR 2907421 4/2008
GB 937046 9/1963
(Continued)

OTHER PUBLICATIONS

International Search Report of PCT/IL2015/051117 Completed Mar. 1, 2016; dated Mar. 3, 2016 3 Pages.
(Continued)

*Primary Examiner* — Christopher P Ellis
(74) *Attorney, Agent, or Firm* — The Roy Gross Law Firm, LLC; Roy Gross

(57) ABSTRACT

A pressurized, fluid-filled channel network embedded in an elastic structure, asymmetrically to the neutral plane, is used to create a deformation field within the structure by the pressurization of the embedded fluidic network, which can be applied in accordance with external forces acting on the structure. The deformation of the structure resulting from the liquid pressure and geometry of the network is related to a continuous deformation-field function. This enables the design of networks creating steady arbitrary deformation fields as well as to eliminate deformation created by external time varying forces, thus increasing the effective rigidity of the beam. By including the effects of the deformation created by the channel network on the beam inertia, the response of the beam to oscillating forces can be modified,
(Continued)

enabling the design of channel networks which create predefined oscillating deformation patterns in response to external oscillating forces.

22 Claims, 9 Drawing Sheets

(51) Int. Cl.
*B64C 1/34* (2006.01)
*B29L 31/30* (2006.01)

(56) References Cited

U.S. PATENT DOCUMENTS

| | | | |
|---|---|---|---|
| 3,473,761 A | 10/1969 | Chutter | |
| 5,222,699 A * | 6/1993 | Albach | B64C 3/48 244/213 |
| 5,288,039 A * | 2/1994 | DeLaurier | B64C 3/52 244/219 |
| 5,374,011 A * | 12/1994 | Lazarus | B64C 3/48 244/195 |
| 6,145,791 A * | 11/2000 | Diller | B64C 3/48 244/130 |
| 6,358,021 B1 * | 3/2002 | Cabuz | B64C 3/38 251/129.02 |
| 6,638,466 B1 * | 10/2003 | Abbott | B29C 33/68 264/238 |
| 6,772,673 B2 * | 8/2004 | Seto | B25J 9/142 92/92 |
| 7,055,782 B2 * | 6/2006 | Dittrich | B64C 3/46 244/123.11 |
| 8,382,043 B1 | 2/2013 | Raghu | |
| 9,227,721 B1 * | 1/2016 | Nguyen | B64C 9/14 |
| 9,908,611 B2 * | 3/2018 | Haslach | B64C 3/48 |
| 2005/0056731 A1 * | 3/2005 | Hamilton | B64C 3/30 244/219 |
| 2005/0216141 A1 * | 9/2005 | Phillips | B64C 3/10 701/7 |
| 2011/0064579 A1 * | 3/2011 | Thomas | B63G 8/18 416/146 R |
| 2013/0064666 A1 * | 3/2013 | Thomas | B64C 3/52 416/158 |
| 2015/0047337 A1 * | 2/2015 | Gandhi | B64C 3/44 60/527 |
| 2015/0122951 A1 * | 5/2015 | Wood | B64C 3/44 244/203 |
| 2016/0016355 A1 * | 1/2016 | Marcoe | B29C 61/0625 174/255 |
| 2017/0175705 A1 * | 6/2017 | Garver | B64C 3/38 |

FOREIGN PATENT DOCUMENTS

| | | | |
|---|---|---|---|
| JP | H07215296 | 8/1995 | |
| WO | 1998049976 | 11/1998 | |
| WO | WO-2009137143 A1 * | 11/2009 | B64C 3/48 |
| WO | 2012148472 | 11/2012 | |
| WO | 2013110086 | 7/2013 | |
| WO | 2013148340 | 10/2013 | |

OTHER PUBLICATIONS

Written Opinion of PCT/IL2015/051117 Completed Mar. 1, 2016; dated Mar. 3, 2016 5 Pages.

* cited by examiner

SOLID-LIQUID COMPOSITE STRUCTURES

This application is National Phase application that claims the benefit of priority of PCT/IL2015/051117 entitled "SOLID-LIQUID COMPOSITE STRUCTURES", filed Nov. 19, 2015, which claims the priority of GB 1420644.5 filed Nov. 20, 2014. The disclosure of all applications are incorporated by reference in their entirety.

FIELD OF THE INVENTION

The present invention relates to the field of solid mechanical structures having fluid enclosures within their bulk, which are operative to amend the elasto-mechanical properties of the structure, and especially as applied to pressurized liquid-filled parallel-channel networks embedded in elastic beams.

BACKGROUND

In the field of soft-actuators and soft-robotic applications, it is known to use fluidic networks embedded within soft structures whose deformation it is desired to control, by means of the pressure applied to the fluid embedded in the structure. The fluid applies pressure on the fluid-solid interface, and the solid is thus deformed. Some examples of such applications can be found in U.S. Pat. No. 6,772,673 to T. Seto et al, for "Flexible Actuator", in WO2012/148472 by President and Fellows of Harvard College, for "Soft Robotic Actuators", in WO2013/148340 by President and Fellows of Harvard College, for "Systems and Methods for providing Flexible Robotic Actuators", and in WO1998/049976 by S. Huang, for "An Artificial Tubular Muscle and Application thereof". These prior art documents describe the use of pressurized channels or networks of channels for generating motion, and especially bending motion in the flexible element in which the channels are incorporated. The main emphasis of all of these references is qualitative, in describing various embodiments by which controlled bending motion can be generated in the elements, either for use as soft robotic actuating elements, or, in the case of WO1998/049976, as an artificial muscle. The elements are generally designed by means of trial and error methods. In FR 2 907 421 to Airbus France SAS, for "Element de Panneau Deformable et Panneau le Comprenant", there is described a deformable panel element, made of an elastomer body fortified with a frame of extendible members to limit its deformation, and incorporating an internal inflatable sealed chamber which can be filled with fluid. When the fluid is pressurized, the panel adopts a deformed configuration shape, which returns to its equilibrium shape when the pressure is released. In another implementation shown, two such panel elements are bonded together, so that the shape of the composite panel element is determined by the pressure of the fluid in both of the chambers.

However, in the above referenced prior art, the effects of the internally generated forces resulting from the pressurized channels or chambers, on the elastic and mechanical properties of the element in which they are embedded, have not been quantitatively investigated, and any novel material properties resulting therefrom and the practical application thereof are so far essentially uncharted.

Furthermore, the prior art has not considered the effect of the viscosity of the fluid used to pressurize the chambers, and the effects of the use of a highly viscous fluid are hitherto unknown The disclosures of each of the publications mentioned in this section and in other sections of the specification, are hereby incorporated by reference, each in its entirety.

SUMMARY

The present disclosure describes new composite material structures generated by embedding in a flexible solid, fluid-filled networks, such as connected cells or channels having precalculated sizes, positions, spacings or other physical properties, and applying predetermined pressure at the channel network inlet in order to modify the elastic or elasto-mechanical properties of the flexible solid. The fluid may be a gas or a liquid. The embedded network should have asymmetric spatial properties relative to the structure in which it is embedded, thereby creating a local moment which attempts to deform the structure. Such spatially asymmetric properties may be most conveniently generated by use of an offset location relative to the midline of the structure, though it may also be possible to use other asymmetries to generate this effect, such as channel network with asymmetrically shaped channels relative to the centerline of the channels. Such networks can create complex predetermined deformation patterns within the structure. The elastic properties of the material of a structure without the effect of the embedded network, determine the deformation which the structure undergoes as a result of the application of external forces. By tailoring the deformation fields generated internally by such a pressurized embedded network to counteract such externally applied forces, it becomes possible to obtain a structure made of the same material but having greater rigidity to such externally applied forces. In an ideal situation, it becomes possible to essentially completely compensate or offset the deformation effects of the externally applied force field by means of the internally applied deformation from the pressurized network, such that no net deformation of the material results.

A convenient exemplary structure which can be used to determine the properties of such a compensating fluid-solid material, is the case of an elastic beam, in which there is embedded a pressurized liquid-filled parallel channel network. The network of channels is positioned asymmetrically to the neutral plane of the beam, and a deformation-field is generated within the beam. In contrast to the above referenced prior art embedded fluidic networks, used in the context of soft-actuators and soft-robotic applications, and in panel shape adjustment, where the elements are intended for generating motion, and especially bending motion in the elements, in the present disclosure, the overall elastic properties of the composite material of the element are used to create novel composite materials having macro-elastic properties, tailored to provide elastic properties different from that of the parent solid material. Novel applications of such materials can then be envisaged, including configurations in which the pressure in the channel-network is created directly from external forces acting on the beam. The beam can thus be viewed as a passive solid-liquid composite structure, which is self-reactive to its external force environment, and which can operate without the need for any control inputs, as opposed to the above-described prior art structures, which are active actuators, externally operated by applied control signals, typically obtained from a robot control system.

The deformation of such structures can be calculated by relating the pressure field in the fluid, the number of cavities per unit length of the structure, and the effect of a single cavity or channel on the deformation to obtain a continuous deformation-field function. This enables the design of networks for creating arbitrary deformation fields. New "materials" can thus be created that eliminate deformations generated by external time-varying forces, thus increasing the effective rigidity of a beam constructed using these composite materials. In addition, by including the effects of the deformation created by the channel network on the beam inertia, the response of the beam to oscillating forces can be modified. This enables the design of channel networks which create pre-defined oscillating deformation patterns in response to external oscillating forces.

In this disclosure, a calculation is shown that enables the use of a closed form equation for determining the deformation obtained by a composite solid-liquid structure, as a function of the elastic characteristics of the materials, of the shape and number of channels, of the position of the channels, and of the pressure applied to the liquid. This method can thus be used to approximate the mechanical behavior of such a composite solid liquid structure such that it will behave in the manner required.

By use of the methods described in the present disclosure, it becomes possible to design a system of internal channels such that the internal deformation generated by the pressure within the internal channels cancels deformations generated by an externally applied load. If this can be done dynamically in real time, the beam or other structural element will then behave as though it has a stiffness higher than that of the base solid material of the beam or other structural element, and hence will deform under an externally applied force less than a prior art solid structure of the same base material.

This means that the effective stiffness of the material is increased. The increased stiffness of the composite element means that for a specific load or force-bearing function, an element of smaller dimensions can be used compared to a non-composite element made of the base solid material. As an example, by correct design of the embedded channel network, a beam made of rubber having a Young's modulus of the order of $10^6$ [Pa] can be made to appear as though it has the stiffness of a beam made of a material having a Young's modulus of the order of $10^7$ [Pa] or even higher. Furthermore, the stiffness can be adjusted at different regions of the structure by the appropriate design of the position of the channels within the structure.

Such novel composite solid-liquid materials may have novel uses. As one example, the wing of an aircraft is considered. The moment acting on the wing increases with decreasing distance from the fuselage, this being the reason that the wing is wider close to the fuselage. By use of the present composite solid-fluid structures, it becomes possible to plan a wing having a more uniform cross-section, since the stiffness of the structure can be made larger close to the fuselage than at the wing tip. Thus the wing could be made such that the deformations generated by the lift at each point along its length can be compensated for by the internal deformations generated by the internal pressurized fluid channels. Alternatively, the composite solid-fluid wing structure can be designed such that the profile can change dynamically from moment to moment, in accordance with the different external loads to which the wing is subjected during different flight phases or flight conditions. Additionally, although the wing of an aircraft is not generally a solid spar, the solid-liquid composite structures described herein can be used for structural members making up the frame of a wing, or for the skin of the wing, with all of the incumbent advantages thereby.

There are two sets of forces operating on the structure—one comprising the externally applied forces, and one arising from the internal pressure-field of the fluid channels. In order for the internally produced reaction forces to compensate for the forces externally applied to the structure, and thus to change the effective stiffness of the structure, it is necessary to input the level of those externally applied forces to the element pressurizing the fluid in the fluid channel network, in order that the compensation be correctly applied. This can be achieved by using a sensor system which determines the level of the externally applied forces, and a feedback control loop which determines the level of internal fluid pressure required and which applies that pressure to the fluid channels. This could be achieved by the use of a pump element to change the internal pressure within the channels in order to change the stiffness as required. If the structure is divided into several separate parts, each part can be pressurized independently, and the stiffness varied according to the deformations sensed, for instance, by sensors along the structure.

However, a simple and convenient method of adjusting the internal pressure in the channels can be achieved by use of a mechanical element directly transferring the externally applied force to an element which directly compresses the fluid. One such example could be by applying the external force to a pin which acts as a piston controlling the pressure within the channels. This can then be considered as a pseudo-closed loop feedback system, without the need for an external controller, and if the mechanical force transfer element and the piston configuration are correctly chosen, the structure can be maintained as close as possible to its undistorted shape. The externally applied forces, or a proportional part thereof, are directed to the piston and as the force on the piston increases, leading to increased externally generated deformation, the pressure in the fluid channels increases, thereby increasing the stiffness of the structure and combating the increased external forces. Thus, according to this exemplary arrangement, the compensation effect can be generated automatically without the need for an external controller. Many applications exist of such an automatic feedback system for composite solid-liquid structures, especially to mimic human bodily functions where reflex muscular action occurs. For instance, if a robotic prosthetic leg were to be correctly constructed of such materials with the feedback system proposed herewithin, it is possible to derive the force feedback signal from the impact of the leg on the ground, and to stiffen the leg structure in accordance with the gait of the user. Thus, when the user is running, the reaction force on the ball of the foot is high, and the robotic leg could be made stiffer than when the user is walking or standing.

In the prior art references on fluid channels within solid structures, the behavior of the structures has been studied statically, or at most, quasi-statically. True dynamic motion characteristics of such structures, involving inertial effects, have not been analytically determined. According to the methods of the present disclosure, since the mechanical behavior of the composite fluid/solid structure can be calculated rigorously, it is possible to determine dynamic motion characteristics, by including the effect of inertia elements in planning the channels to be used for generating the internal stresses.

The composite solid-fluid materials of the present disclosure can amend the calculated properties of the structure on a dynamic basis, using dynamic feedback to reduce the effect of dynamic vibrations on a structure, such as a beam, by cancelling out the inertial response of the beam. The effect of the inertia of a solid beam and the interaction of the fluid channels with the beam can be modelled, and it is then possible to predict how the beam will vibrate as a result of an externally applied periodic perturbation. If such an externally applied periodic force were, for instance, to generate a certain amplitude sinusoidal vibration of the beam if it were solid, the beam can now be controlled using the methods of the present disclosure, to oscillate with a smaller amplitude by means of a feedback mechanism operating on the piston which compresses the fluid in the channels. If this trade-off is correctly performed, it is possible to reduce the vibration level of the beam substantially, such that this system provides a method of vibration cancellation. The elastic deformation generated by the moment operating on the vibrating beam can be canceled out dynamically by the deformation generated by the internal fluid channels. Besides being able to reduce periodic vibration amplitude, dynamic compensation can also be performed for any time varying applied forces, such that random bending motions, such as would be encountered on the aircraft wing mentioned hereinabove, can also be reduced.

In the prior art fluid channel soft-robotic actuators, and in the implementations of the novel solid-fluid composite structures described hereinabove in the present disclosure, it is assumed that the fluid has a sufficiently low viscosity that its pressure is evenly, equally and instantaneously applied over the whole of the fluid channel network. That means that the fluid is in a quasi-static state, and the characteristic motion response times of the fluid flow are generally much faster than the characteristic response times of the externally applied excitation effect. The fluid thus responds readily to the typical perturbation frequencies present in mechanical systems, such as those applied to the vibrating beam described herewithin.

However if a fluid is used that is sufficiently viscous that the dynamics of the flow of the fluid through the channels becomes a significant factor in the behavior of the beam response, additional control mechanisms for the deformation behavior of the beam can be obtained. The change in the volume of the embedded network due to pressurization creates flow into the beam, which in turn yields a viscous-elastic time scale for the propagation of pressure in the channel. Since the viscous resistance creates a spatially and time dependent pressure field, by controlling the pressure variation at the inlets, the deformation field enables additional modes of deformation patterns, in addition to time-dependent inertial effects and spatial effects relating to the network geometry.

The characteristic time scales for viscous fluid motion and for solid motion due to the internal pressure, both govern the coupled behavior of the system and their dependence on the various physical parameters defining the system. This enables the creation of elaborate complex time-varying deformation fields. Such solutions can effectively emulate complex motions that conventionally would require a plurality of motors, joints, encoders and complex control feedback loops. Specifically, the use of a sufficiently viscous liquid allows the limiting of an oscillating deformation to only part of the beam, while keeping the rest of the beam stationary. In addition, deformation fields similar to standing wave and moving wave can be created for a given beam, without the need to create a new channel geometry for each deformation mode, just by suitably modifying the pressure at the inlets.

Although a beam is used to illustrate many of the features of the calculations, characteristics and uses of the composite solid-fluid structures described in the present disclosure, it is to be understood that this is not meant to limit the application in any way, but that composite solid-fluid structures of any shape or form are intended to be covered by the disclosure, subject to the designer's ability to calculate or estimate the elastic properties of that shape or form. Furthermore, references to the compensation or offsetting of externally applied forces by the internally generated deformations are not intended to imply only complete cancellation, but are intended to include any desired range in which the effects of the externally applied forces are reduced.

There is thus provided in accordance with an exemplary implementation of the devices described in this disclosure, a structural element comprising:

(i) a base material having a predetermined stiffness, and (ii) a set of channels configured to be filled with fluid and embedded within the base material such that at least some of the channels are spatially asymmetric relative to the neutral plane of the structural element, wherein at least the positions of the set of channels within the base material, the dimensions of the set of channels and the pressure of the fluid within the channels are designated such that a deformation field generated by the pressure applied to the fluid within the set of channels is adapted to offset deformations caused to the element by the application of externally applied forces.

In such a structure, at least some of the channels may be located in a position offset from the midline of the element. Furthermore, the cross sectional geometric shapes of at least some of the set of channels may be configured in determining the deformation field.

Additionally, in any such structures, the deformation field generated by the pressure applied to the fluid within the set of channels may be determined by integration of the products of the channel density at points along the structural element with the geometric deflection generated by the pressure applied to the fluid in a single channel at the points along the structural element. In such structural elements, the geometric deflection generated by the pressure applied to the fluid in a single channel at a point along the structural element, may be determined as a function of at least:

(i) the level of the pressure within the channel, (ii) Young's modulus of the material of the structural element, (iii) Poisson's ratio of the material of the structural element, (iv) the offset of the channel from the centerline of the structural element, and (v) the size of the channel relative to the dimension of the structural element in the direction of the deflection.

In additional implementations of such structural elements, the level of the pressure may be generated from the level of the externally applied force. In such a case, the level of pressure may be generated by a signal derived from the level of the externally applied force, or by direct application of the externally applied force to a piston generating the pressure.

Furthermore, in any of such structural elements, the pressure may be changed dynamically such that the vibrational response of the element to time dependent applied forces is reduced. Additionally, when the pressure is applied to the fluid within the channels, such structures enable the effective stiffness of the structural element to be higher than the predetermined stiffness of the base material. This higher stiffness of the structure enables the structural element to have dimensions smaller than would be required if the structural element were constructed only of the base material. Such structural elements may be used as part of an aircraft wing, and the externally applied forces may be aerodynamic forces operating on the wing.

In accordance with yet further exemplary implementations, there is proposed a system for reducing the effect of deformation of a structural element by external forces, the system comprising:

(i) a structural element constructed according to any of the above described implementations, (ii) a sensing element actuated by the external forces, and (iii) a compressor generating the pressure for application to the fluid within the channels according to the output of the sensing element.

In such a system, the sensing element may be a mechanical element actuated by the external forces and connected to the compressor. In that case, the compressor may be a piston attached to the mechanical element and compressing the fluid within the channels. The sensing element itself may be one or more force sensors disposed such that the external forces are detected by the force sensor or sensors, the system further comprising a controller for accepting a signal from the at least one sensor and actuating the compressor in accordance with the signal.

In any of the above described structures the fluid contained in the set of channels may have a viscosity sufficiently high that the pressure within the set of channels varies spatially along the channel network.

Yet other implementations perform a method of increasing the effective stiffness of a structural element, the method comprising:

(i) providing a base material constituting the basis of the structural element, the base material having embedded therein a set of channels containing a fluid, at least some of the channels being spatially asymmetric relative to the neutral plane of the structural element, and (ii) pressurizing the fluid in accordance with the configuration of an external force field incident on the structural element, wherein at least the positions of the set of channels within the base material, the dimensions of the set of channels and the pressure of the fluid within the set of channels are configured so that a deformation field generated by the pressurizing of the fluid is adapted to offset deformations that would be caused to the structural element by the externally applied force field, such that the effective stiffness of the structural element is increased.

In the above described method, at least some of the channels may be located in a position offset from the midline of the element. Also, the cross sectional geometric shapes of at least some of the set of channels may be suitably configured in determining the deformation field.

According to further implementations, the deformation field generated by the pressure applied to the fluid within the set of channels may be determined by integration of the products of the channel density at points along the structural element with the geometric deflection generated by the pressure applied to the fluid in a single channel at the points along the structural element. In such a method, the geometric deflection generated by the pressure applied to the fluid in a single channel at a point along the structural element, may be determined as a function of at least:

(i) the level of the pressure within the channel, (ii) Young's modulus of the material of the structural element, (iii) Poisson's ratio of the material of the structural element, (iv) the offset of the channel from the centerline of the structural element, and (v) the size of the channel relative to the dimension of the structural element in the direction of the deflection.

In any of the above described methods, the level of the pressure may be generated from the level of the externally applied force field. If so, the level of pressure may be generated by a signal derived from the level of the externally applied force field, or by direct application of the externally applied force field to a piston generating the pressure.

Other implementations of these methods may further comprise changing the pressure dynamically such that the vibrational response of the element to time dependent applied forces is reduced. Furthermore, the increased stiffness of the structure generated by use of these methods, enables the structural element to have dimensions smaller than would be required if the structural element were constructed only of the base material.

Additionally, in any of these methods, the fluid contained in the set of channels may have a viscosity sufficiently high that the pressure within the set of channels varies spatially along the channel network.

BRIEF DESCRIPTION OF THE DRAWINGS

The present invention will be understood and appreciated more fully from the following detailed description, taken in conjunction with the drawings in which:

FIG. 3A shows a sinusoidal deformation field, while FIG. 3B shows a circular deformation field;

FIG. 5A shows a simple mechanical arrangement for achieving feedback of the applied force; FIG. 5B shows the effect of the force feedback shown in FIG. 5A on the beam deformation; FIG. 5C shows the time response of the vibration amplitude of the solid beam of FIG. 5A to an impulse applied to the beam.

Figure 6A:
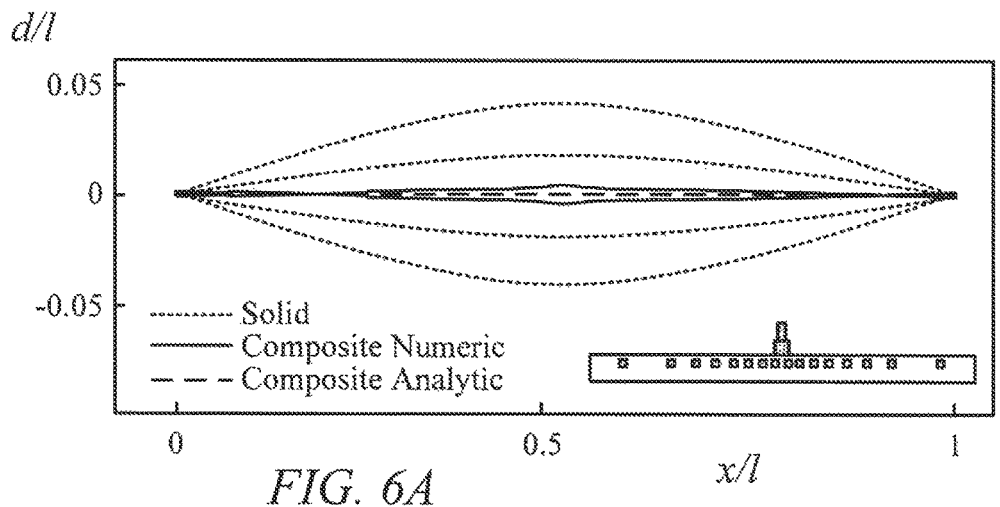
FIGS. 6A to 6C illustrates deflection of a solid-liquid composite beam due to external oscillating force acting at $$\frac{x}{l} = 0.5,$$
Figure 6B:
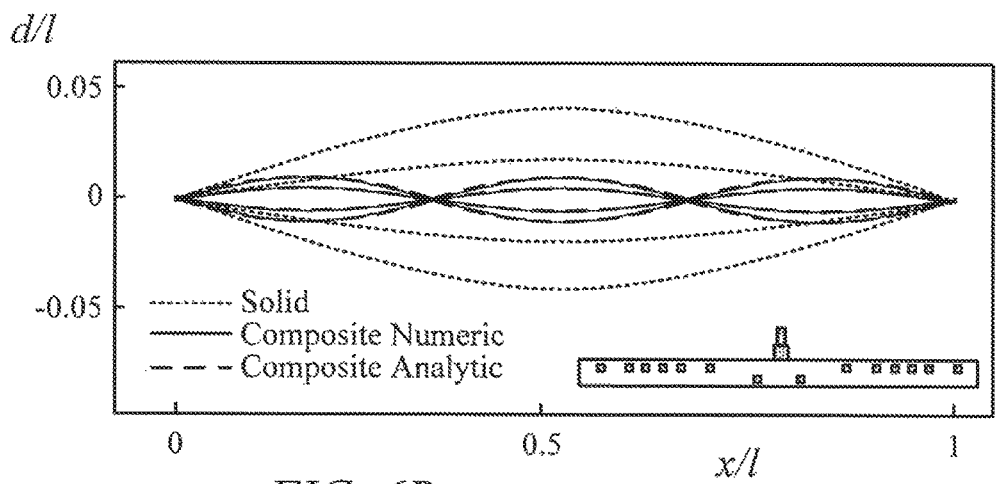
Figure 6C:
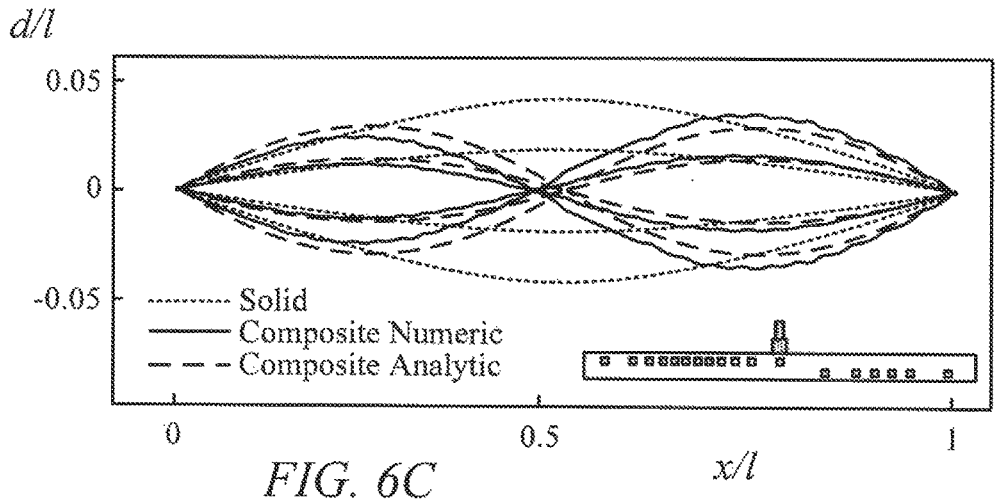
Figure 7A:
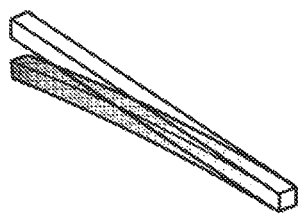
Figure 7B:
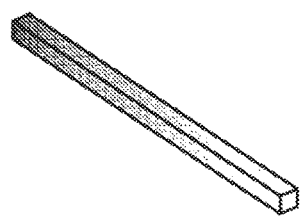
Figure 7C:
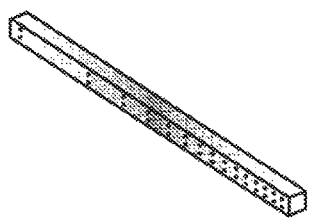
Figure 7D:
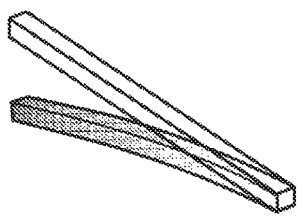
Figure 7E:
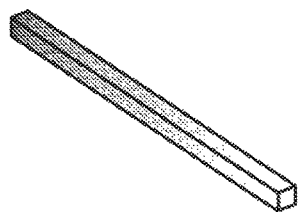
Figure 7F:
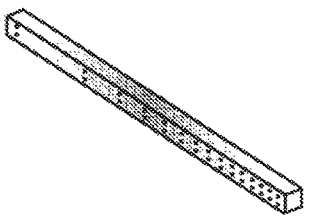
Figure 7G:
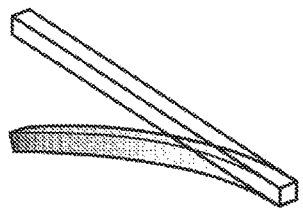
Figure 7H:
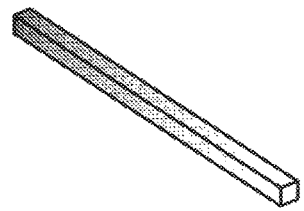
Figure 7I:
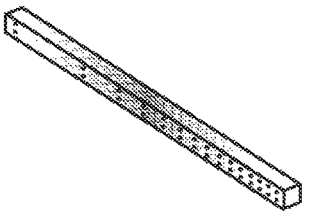
Figures 8A, 8B:
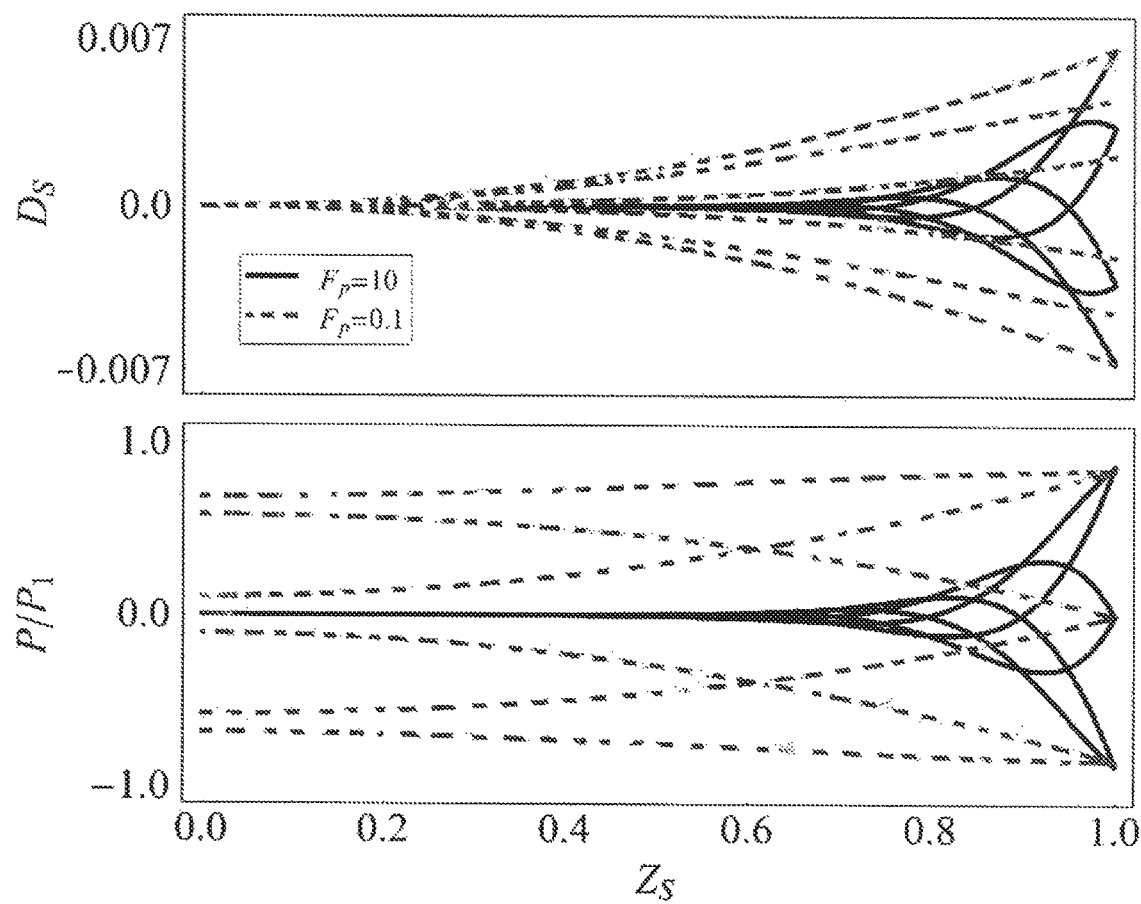

and appropriately designed parallel channel networks to generate different oscillation configurations, with FIG. 6A showing a zero deformation configuration, and FIGS. 6B and 6C different spatially varying beam oscillation amplitudes;

FIGS. 7A to 7I illustrates graphically how a composite solid-fluid beam with embedded channel networks is able to provide a load-supporting structure having rigidity substantially higher than that of a solid beam of the same dimensions;

FIGS. 8A and 8B illustrate results obtained by the use of a fluid having high viscosity in the channels of the beam structures described in the previous drawings, to limit an oscillating deformation to only part of the structure while keeping the rest of the structure essentially stationary; and FIGS. 9A and 9B, and FIGS. 10A and 10B illustrate various results obtained by the use of a fluid having high viscosity oscillating pressure introduced to inlets of the channel network at both ends, as a mechanism to create wave-like deformation fields.

DETAILED DESCRIPTION

In order to endow the composite solid-fluid materials with the elastic properties desired of them, it is first necessary to determine analytically, the stress-field and deformation-field generated within the solid as a result of the internally pressurized network of fluid channels. Without this information, it is impossible to determine the channel configuration necessary to provide the desired interaction with a given solid structure having known mechanical dimensions and elastic characteristics. This channel configuration may include the position, spacing, number, geometry and dimensions as well as the internal pressure-field within the channel network.

Figure 1A:
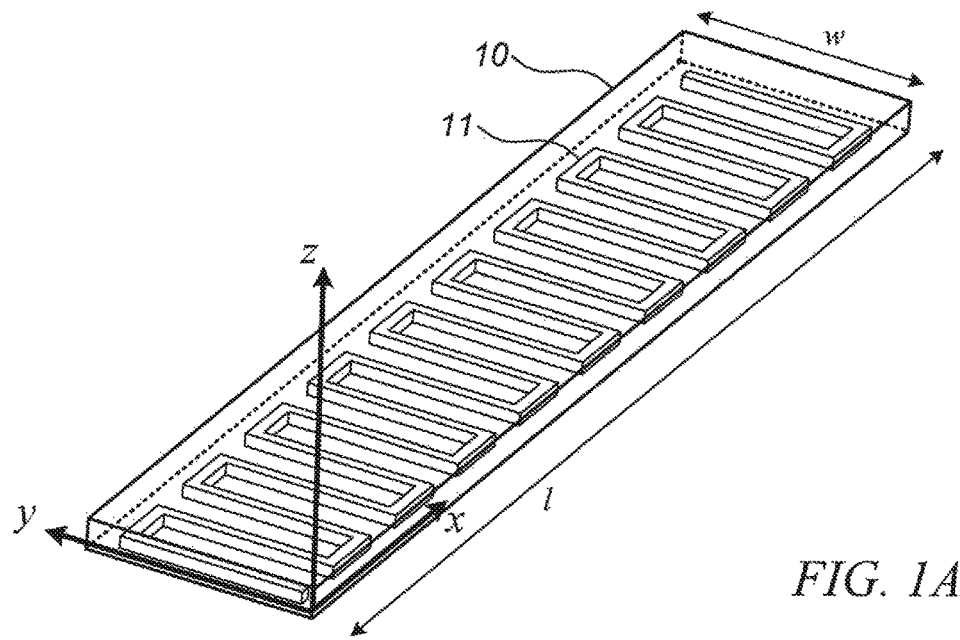
FIG. 1A illustrates schematically an exemplary rectangular beam with an embedded interconnected parallel channel network, while FIG. 1$b$ shows the off-axis nature of the channel network.
Figure 1B:
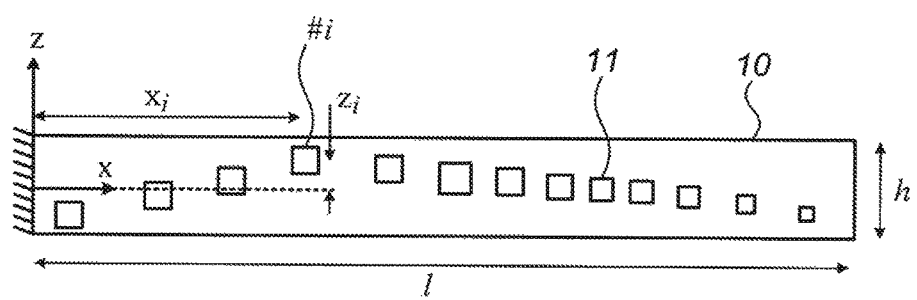

In order to illustrate the derivation of such a relationship, reference is first made to FIG. 1A, which illustrates schematically an exemplary rectangular beam 10 with an embedded interconnected parallel channel network 11, in which each successive channel is designated by the suffix i. The exemplary beam shown has height h, width w and length l, which are of magnitude such that $h/w \ll 1$ and $w/l \ll 1$. The Young's modulus, density and Poisson's ratio of the beam material are respectively E, $\rho$ and v. The channel network may be distributed within the beam perpendicular to the $x_s$-$z_s$ plane, and off-axis, as shown in FIG. 1B. The liquid pressure is p. The difference between the length of a single channel and the width of the beam w is assumed to be negligible compared with w. The total length of channel segments connecting the parallel channels is, for the purposes of this derivation, assumed to be negligible compared with the total length of channel network. In addition, the channel network is assumed to have a negligible effect on the second moment inertia of the beam. The normalized deflection of the beam is denoted by d/l and is a function of location $z_s$ and time t. An assumption is made that deflections are small, so that the net deflection d is a sum of $d_e$, the deflection due to external forces, and $d_c$, the deflection due to the pressurized channel network, i.e. $d = d_e + d_c$. Although the beam shown in FIGS. 1A and 1B uses a homogeneous solid material as the solid phase of the composite structure, it is to be understood that this is only in order to use a simple structure for analyzing the mechanical behavior of the system, and that for practical purposes, a beam made up of separate solid components, each with its own stiffness, may be used in practice. As an example, the beam could be composed of two solid components, one having a higher Young's modulus to provide good base stiffness to the beam, and the other having a lower Young's modulus, with the channel network embedded in the material of lower stiffness in order to achieve control of the overall flexibility of the beam by means of the solid-fluid structure mechanisms of the present disclosure.

Figure 2A:
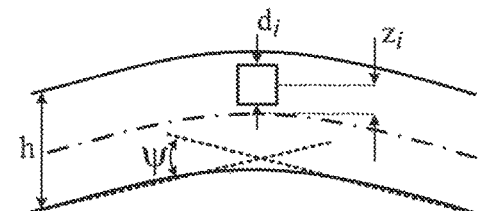
FIGS. 2A to 2D illustrate several examples of the results of the expected angular bending of a beam arising from a single pressurized channel embedded therein, offset from the mid-plane of the beam.

It is known that a single pressurized channel creates local stress and strain-fields which decay far from the channel. Reference is now made to FIGS. 2A to 2D which illustrate several examples of the results of the expected angular bending of a beam of height h, arising from a single square cross-sectioned pressurized channel i of width and height $d_i$, embedded therein, and offset from the mid-plane of the beam by a distance $z_i$. FIG. 2A shows the change of the slope of the beam due to the asymmetric strain-field of such a pressurized channel positioned asymmetrically with regard to the mid-plane. For a sufficiently small ratio $h/w \ll 1$, the problem is approximately two-dimensional, and the change in beam slope due to a single channel i can be defined as $\psi$, which is a function of:

(i) the pressure p within the channel,
(ii) Young's modulus E of the solid material of the beam,
(iii) the Poisson's ratio v of the beam solid, and
(iv) the ratios of the offset and size of the channel relative to the beam height, $$\frac{z_i}{h}$$

and $$\frac{d_i}{h}$$

respectively.

The expression for determining $\psi$ is obtained by simple geometry as:

$$\frac{\partial d_c(x_i + \Delta x)}{\partial x} - \frac{\partial d_c(x_i - \Delta x)}{\partial x} = \psi\left(\frac{p}{E}, v, \frac{z_i}{h}, \frac{d_i}{h}\right), \quad (1)$$

where $x_i$ is a location of the center of the channel i and $\Delta x$ is sufficiently large that the stress-field vanishes. In essence, for more general configurations not necessarily limited to beams, Equation (1) simply describes the effect of a single cavity or channel on the angle of bending of the elastic structure. The value of $\psi$, which is the change in beam slope due to a single channel, can be obtained numerically or experimentally for a given material, pressure and channel configuration. In FIGS. 2A to 2D, there are presented values of $\psi$ obtained by numerical computations, as follows:

FIG. 2A illustrates the definition of $\psi$ and the geometric parameters of the channel.

Figure 2B:
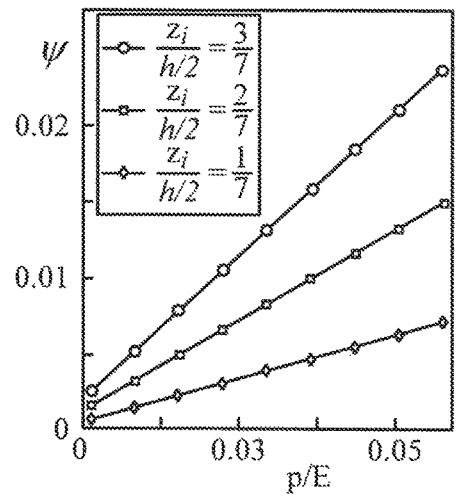

FIG. 2B presents $\psi$ as a function of p/E for various values of $z_i/(h/2)$ where $d_i/(h/2) = 4/7$. $\psi$ is shown to increase monotonically with $z_i/(h/2)$.

Figure 2C:
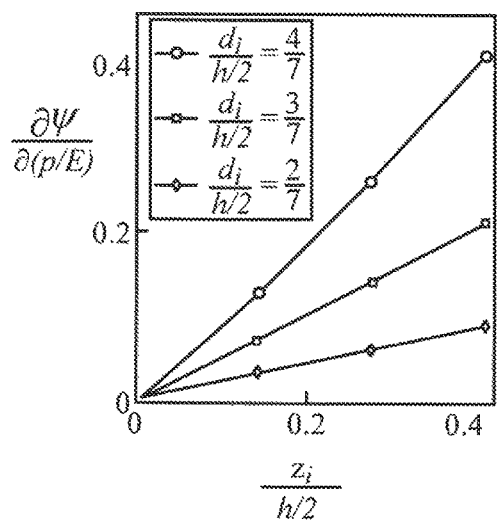

FIG. 2C presents $\partial \psi / \partial (p/E)$ as a function of $z_i/(h/2)$ for various $d_i/(h/2)$.

Figure 2D:
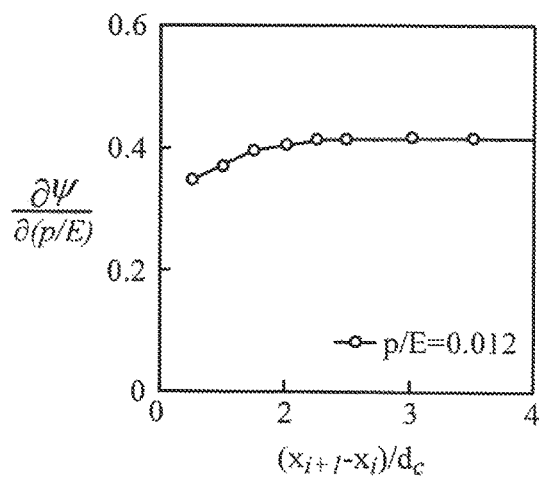

FIG. 2D presents $\partial \psi / \partial (p/E)$ as a function of $(x_{i+1} - x_i)/d_i$, showing the effect of interaction between adjacent channels on $\partial \psi / \partial (p/E)$. The curve is essentially independent of the value of p/E for practical ranges of p/E.

From what is shown in FIGS. 2A to 2C, the value of $\psi$ is seen to be approximately linear with p/E. For a single deforming channel, the beam slope $\psi$ can be expressed by:

$$\psi \approx \frac{p}{E} \frac{\partial \psi}{\partial (p/E)} \left( \frac{p}{E} = 0, v, \frac{z_i}{h}, \frac{d_i}{h} \right). \quad (2)$$

Equation (2) is simply a linearization of Equation (1), which simplifies analytic computations but is not necessary for numerical computations relating the embedded network to the deformation field. The channel density $\phi$ of a parallel channel network, such as that shown in FIG. 1A, is defined as the number of channels per unit length. For characteristic length scale l much greater than the characteristic distance between the channels ($l \gg 1/\phi$), the change in slope can be approximated to a continuous function:

$$\frac{\partial^2 d_c}{\partial x^2} = \frac{1}{dx} \left( \frac{\partial d_c(x+dx)}{\partial x} - \frac{\partial d_c(x)}{\partial x} \right) = \frac{1}{dx}(k\psi), \quad (3)$$

where k is the number of channels in the interval dx, which is intended to comprise a number of channels so as to approximate a continuous medium. Defining the density function of the channels as $\phi = k/dx$ and applying Equation (2) yields a relation between the parallel channel configuration and the deformation pattern created by the pressurized network, the point deformation being denoted as $d_c$:

$$\frac{\partial^2 d_c}{\partial x^2} = -\phi \frac{p}{E} \frac{\partial \psi}{\partial (p/E)} \left( \frac{p}{E} = 0, v, \frac{z_i}{h}, \frac{d_i}{h} \right). \quad (4)$$

where the deformation pattern is defined on the right hand side of Equation (4) as being the product of the channel density with the slope as a function of the pressure in a single channel. Eq. (4) relates the curvature created in the solid to the linear density of channels ($\phi$) and the effect of a single channel on the change in beam slope ($\psi$).

Eq. (4) is an important result, since it enables the determination in closed form of the geometry required of a fluid channel network to create a predetermined deformation field $d_c$. This is a feature of the methods of the present disclosure, in which the channel configuration in a given structure is analytically calculated in closed form to provide a predetermined deformation field.

In essence, Equation (4) approximates the cumulative effects of multiple pressurized channels on the deflection of the beam as a continuous function, which is the multiplication of the density of the channels $\Phi$ and the angle of slope $\Psi$ of a single channel, which in linearized form is given by the above equation (5)—

$$\Psi \approx \frac{p}{E} \frac{\partial \psi}{\partial \left( \frac{p}{E} \right)}.$$

After calculating $\phi$ from Eq. (4) the location of the center of the channel $x_i$ can be determined by integrating the linear density of the channels:

$$\int_0^{x_i} |\phi| dx = i - \frac{1}{2}. \quad (5)$$

Figure 3A:
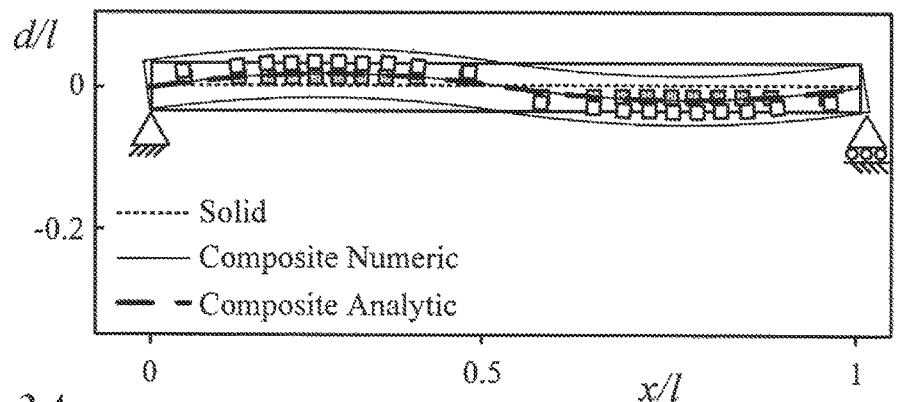
FIGS. 3A and 3B illustrate the results of the use of a theoretical relationship shown derived in the present disclosure in planning the channel network for constructing a beam having an arbitrary steady deformation field.
Figure 3B:
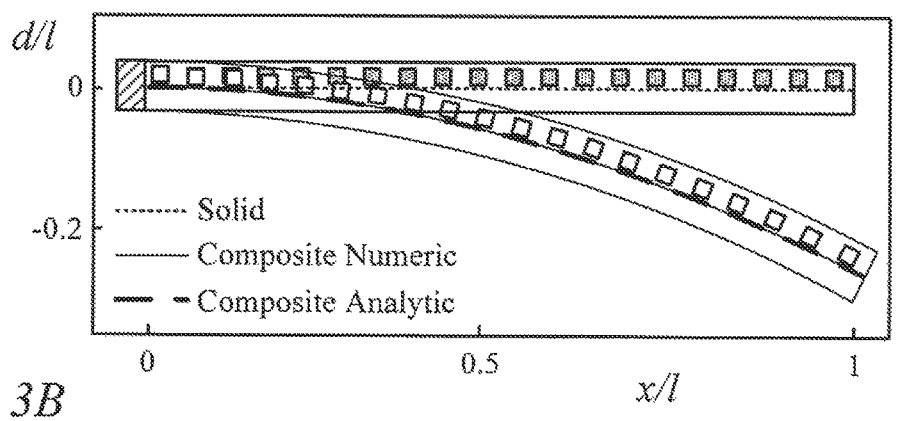

Reference is now made to FIGS. 3A and 3B, which illustrate the exemplary results of the use of the relationship shown in Equation (4) in planning the channel network for constructing a beam having an arbitrary steady deformation field. FIG. 3A shows the results of a sinusoidal deformation field $d_c/l = 0.05 \sin(2\pi x/l)$ while FIG. 3B shows a circular deformation defined by $(x/l)^2 + (d_c/l+2)^2 = 4$.

In both of these examples, good agreement is found between the theoretical planned deformation field and numerical computations based on Equation (4) using $p/E = 0.1$, $d_i/(h/2) = 1$, thereby verifying the accuracy of methods of calculation based on the use of Equation (4).

The numerical computed results are shown in FIGS. 3A and 3B, in which the relative deflection d/l is shown as a function of relative position x/l along the example beam. These results are obtained by simulating an exemplary beam with the following parameters:

h=7 mm, w=50 mm, l=0.1 m, E=8·10$^6$ Pa, $\mu_s$=0.385 Kg/m and v=0.4. $\mu_s$ is introduced as the beam mass per unit length.

In these examples, all fluid networks use square channels having $d_i$=2 mm with, unless otherwise specified, their centers located at either $z_i/(h/2)=3/7$ or $z_i/h=-3/7$, i.e. close to an edge of the beam. The beam includes a 0.5 mm width region on both sides without a network and the connecting channels have properties identical to those of the parallel channels. A spatially uniform pressure p is applied by the fluid at the solid-liquid interface. The computations utilized commercial code COMSOL Multiphysics 4.3™ with 100,000 grid elements to calculate the solid deformation.

As previously explained, the results obtained hereinabove can be used to reduce deformation by external forces and increase the effective stiffness of a structure, in order to more readily stand up to externally applied forces. In order to accomplish this, it is necessary to define the deformation fields generated by the external forces.

For the example used in this disclosure of a slender, linearly elastic beam, the deformation $d_e$ created by steady external forces, results in curvature given by the well-known Euler-Bernoulli beam equation $$\partial^2 d_e / \partial x^2 = M/EI,$$

where M is the bending moment,
E is the Young's modulus of the beam material, and
I=h$^3$w/12 is the second moment of inertia.

Assuming small deformations, the total deflection of the beam is given by $d=d_c+d_e$, which is the sum of the deflections due to the external forces and the deflections due to the internal network pressure. Thus, the deflections due to external forces, $d_e$, can be eliminated if cancelled by equal and oppositely directed deflections arising from internal forces from the fluid channels, as shown in Equation (6):

$$\frac{\partial^2 d_c}{\partial x^2} + \frac{\partial^2 d_e}{\partial x^2} = 0 \text{ and hence} - \frac{p(t)}{E} \phi(x) \frac{\partial \psi(x)}{\partial (p/E)} + \frac{M}{EI} = 0. \quad (6)$$

where the value of $$\frac{\partial^2 d_c}{\partial x^2}$$

is obtained from equation (4), and the value of $$\frac{\partial^2 d_e}{\partial x^2}$$

is obtained from the Euler Bernoulli relation.

For any general time and position dependent bending moment distribution, which can be represented by making $M=f_1(t)f_2(x)$, the deflection field can be eliminated by requiring that:

$$p(t)=f_1(t) \text{ and}$$

$$\phi(x)\partial\psi(x)/\partial(p/E)=f_2(x).$$

Since the total deformation $d=d_e+d_c$ is constant, no inertial effects will be created by the time-varying external forces.

Figure 4A:
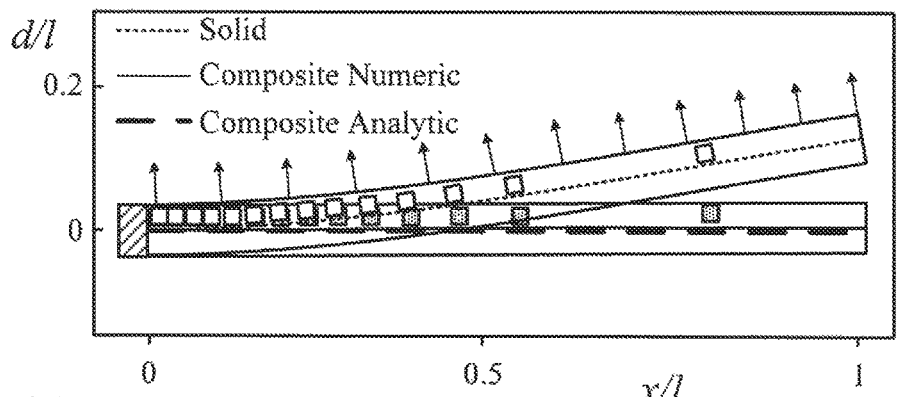
FIGS. 4A and 4B show schematic illustrations of composite solid-liquid beams in which an internal fluidic network is used to cancel the deflection generated by the externally applied force; the force applied in FIG. 4B is twice that applied in FIG. 4A.
Figure 4B:
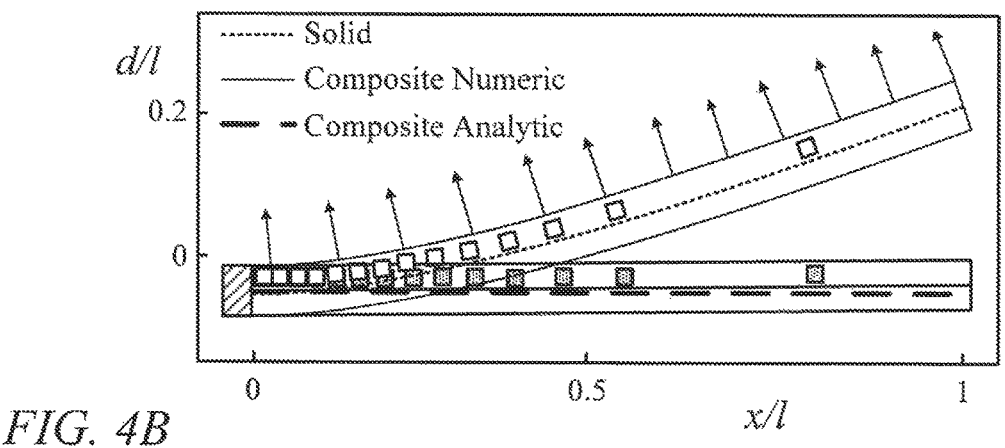

Reference is now made to FIGS. 4A and 4B where there are shown schematic illustration of composite solid-liquid beams in which an internal fluidic network is used to cancel the deflection generated by the externally applied force, thus enhancing the effective rigidity of the beam. In each figure, the upper curved beam outline shows the bending effect of the application of the external force, denoted by the arrows, without any force cancellation by the use of the internally pressurized channel network. The bottom beam outlines show the position of the deformation-cancelled, increased-rigidity beam. The desired deformation field is marked by the dashed lines, and the deformation obtained by numerical computation using the results of the present calculations, is marked by solid lines. For comparison, the position of a solid beam without an embedded channel network is shown by dotted lines. As is observed, the correspondence is good, attesting to the accuracy of the method disclosed herewithin. For the case of a uniform externally applied load, having $q/E=2.5\cdot10^{-5}$, where q is the applied force, such as the lift load acting on an aircraft wing, the required network configuration to provide complete elimination of the deformation can be calculated according to Eq. (6). Since the deformation is linear both with p/E and with q, an increase of q can be eliminated by a proportional increase in p/E. This is shown in FIG. 4B where the deformation resulting from an external uniform load $q/E=5\cdot10^{-5}$, double that shown in FIG. 4A, has been eliminated by doubling the internal pressure without modifying the network configuration used in FIG. 4A.

Figure 5A:
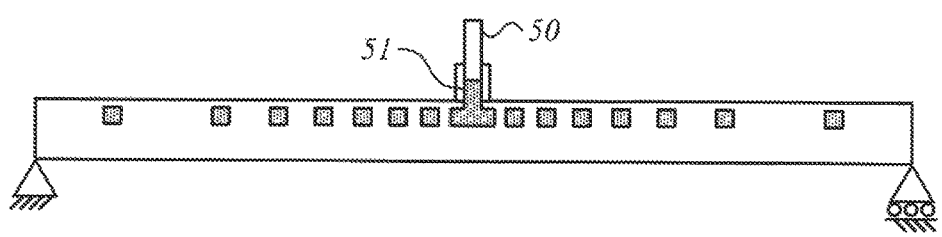
FIGS. 5A to 5C illustrate the application of an applied external force to the internal fluid network of an exemplary beam.

In order to apply the deformation field cancellation procedure denoted by Equation (6), it is necessary to provide to the channel pressurizing mechanism, some sort of input signal corresponding to the externally applied load. Reference is now made to FIG. 5A which illustrates one simple mechanical arrangement for achieving this. The exemplary liquid-solid composite structure shown is in the form of a long beam, and the external force acting on the beam is shown directed to a mechanical force transfer element such as a pin 50, which applies the force directly to the fluid 51 within the internal channel network. The pin 50 thus behaves as a piston, or may be connected to a piston, which compresses the fluid in accordance with the applied force—the higher the force, the higher the pressure applied to the fluid. Such a structure allows control of the response of the material to external loads by the addition of the deformation created by the pressurized network configuration, to the deformation created by the external forces. If the force as a function of time is given by F(t) and the area of the pin or piston is a, then the applied time varying pressure p(t) is given by F(t)/a.

Figure 5B:
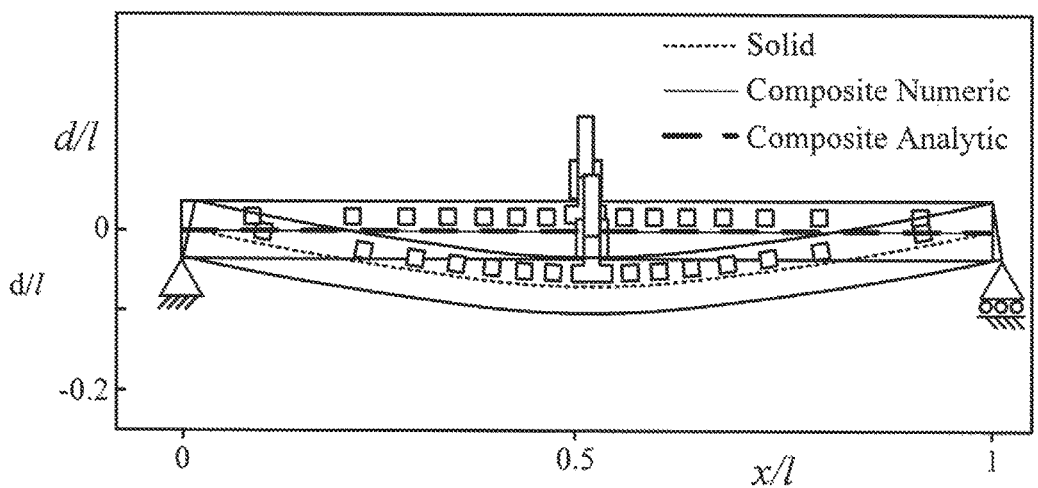

Reference is now made to FIG. 5B which shows the effect of the force feedback shown in FIG. 5A on the beam deformation, as calculated using Equation (4) above. In the example shown in FIG. 5B, the steady external force f applied on the pin is 3.15 N, and the area a of the pin is $6.23\cdot10^{-6}$ m². The uncorrected deformation generated by the external force is reduced to negligible levels once the force feedback applies the pressurization to the fluid in the channel network.

Figure 5C:
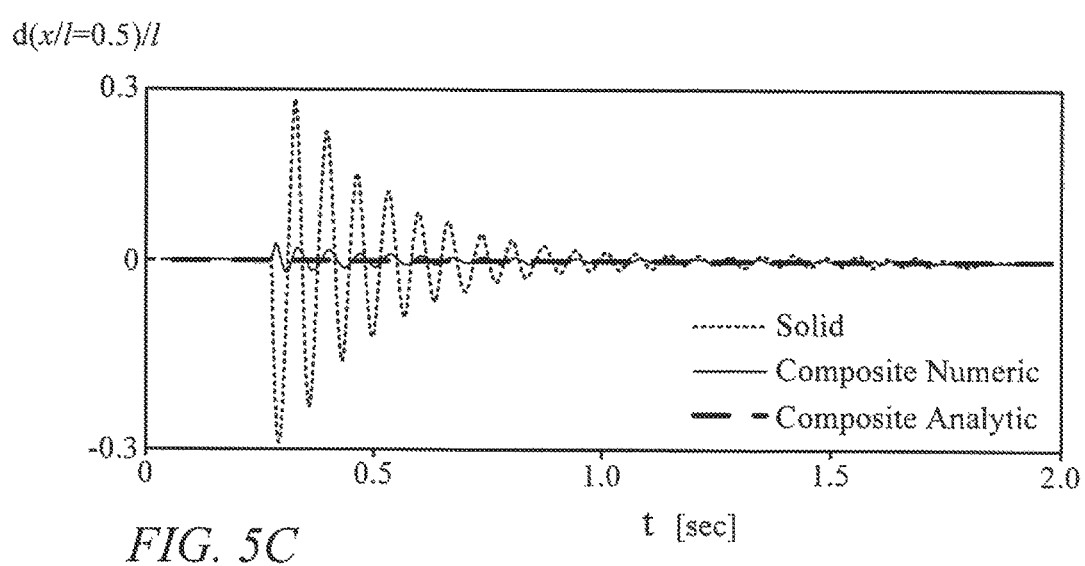

FIG. 5C shows the time response of the vibration amplitude of the solid beam of FIG. 5A to a sudden impulse applied to the beam externally, the impulse characteristics being given by the parameters F=3.15N, $T_{pulse}=0.2$ sec., $T_s=0.02$ sec, $T_{pulse}$ is the time at which the pulse begins and $T_s$ is the time period during which the force is applied. The dashed line shows the response of the non-compensated solid beam, while the solid line shows how the deformation compensation methods described in this disclosure are able to reduce the displacement excursions and the ringing of the beam due to the impulse blow to levels substantially less than those of the uncorrected beam.

Figure 5D:
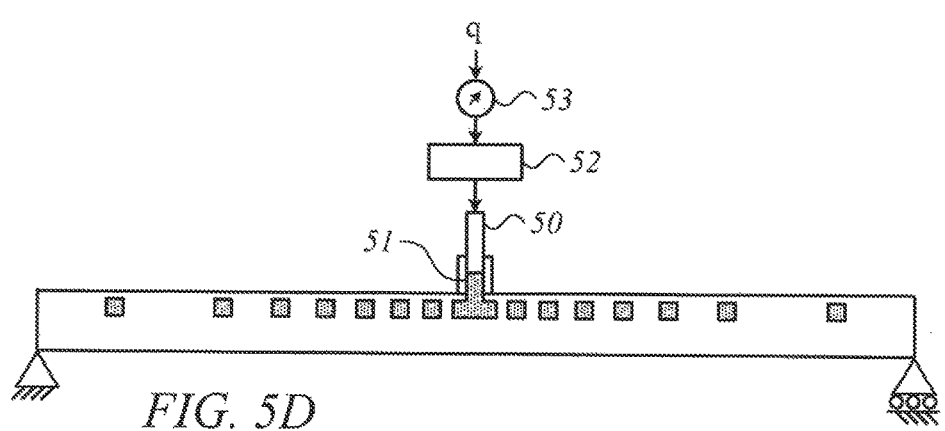
FIG. 5D illustrates schematically the use of one or more force sensors to provide the input signal to a compressor unit to apply pressure to the channels.

Reference is now made to FIG. 5D, which illustrates an alternative system for applying the appropriate pressure to the channel network, based on the measurement of the externally applied force by means of a force sensor. In the system of FIG. 5D, the external force q is measured by a force sensor 53, which is shown schematically in FIG. 5D as a gauge, but would be a sensor with an electronic output of the sensed force, and this output signal is input to a controller 52, which generates the signal necessary to pressurize the fluid in the channel network in accordance with the measured force q. As in the previous embodiment of FIG. 5A, no force feedback signal is necessary, the controller being simply a signal amplitude converter which generates the correct level signal for the pressurizing device based on the measured force. The pressurizing device could be a linearly operated electro-mechanical plunger, similar to the pin 50, or a conventional compressor pump, not shown in FIG. 5D. In the latter case, a feedback signal could be provided to control the pump to ensure that it generates the correct pressure level according to its input signal, but a closed loop feedback system to provide active control of the deformation achieved is not required.

The previously described derivations have been involved with the creation of steady deformation fields. In order to create a pre-defined, time varying deformation field, the design of the internal channel network should include the effects of solid inertia. The deformation field created by the channel-network results in acceleration of the beam, and thus the Euler-Bernoulli equation becomes:

$$\frac{\partial^2}{\partial x^2}\left(EI\frac{\partial^2 d_e}{\partial x^2}\right) = -\mu_s \frac{\partial^2}{\partial t^2}(d_e + d_c) + qw, \quad (7)$$

where $\mu_s$ is the beam mass per unit length and qw is the applied external force. Substituting $d=d_e+d_c$ and the inserting the expression for $$\frac{\partial^2 d_c}{\partial x^2}$$

from Eq. (4) into Eq. (7) results in an expression for the total deflection including the effects of the channel network geometry and time varying, spatially uniform, pressure:

$$\frac{\partial^2}{\partial x^2}\left[EI\left(\frac{\partial^2 d}{\partial x^2} + \phi\frac{p}{E}\frac{\partial\psi}{\partial(p/E)}\right)\right] = -\mu_s\frac{\partial^2 d}{\partial t^2} + qw. \quad (8)$$

From Equation (8), it is now possible to calculate the channel density function for a required periodic oscillating deformation of the form $d=\sum_{n=1}^{\infty}[f_n(x)\sin(\omega_n t+\theta_n)]$ and $q/E=\sum_{n=1}^{\infty}[D_n \sin(\omega_n t+\theta_n)]$. This calculation results in:

$$\frac{p}{E} = \sum_{n=1}^{\infty} C_n \sin(\omega_n t + \theta_n) \tag{9}$$

and $$\phi = \sum_{n=1}^{\infty} \left[ \frac{\int_0^x \int_0^\eta \left( \frac{\mu_s \omega_n^2 f_n(\xi)}{EI} - \frac{wD_n(\xi)}{I} \right) d\xi d\eta - \frac{\partial^2 f_n}{\partial x^2}}{C_n \frac{\partial \psi}{\partial (p/E)}} \right], \tag{10}$$

from which it is observed that the oscillation frequency will affect the choice of the channel distribution $\phi$.

FIGS. 6A to 6C illustrates the dynamic deflection of a solid-liquid composite beam due to external oscillating forces acting at x/l=0.5. The parallel channel networks, as illustrated in the inserts to each figure, are designed by Eq. (10) to create different forms of deflection.

The use of Eq. (10) is illustrated for the case presented in FIG. 5A with $$q/E=C_1\delta(x/l-\tfrac{1}{2})\sin(\omega t)/w \text{ and thus}$$

$$p/E=C_1 \sin(\omega t)wl/a,$$

where $a=2.207\cdot 10^{-6}$ [m$^2$] is the area of the pin and $C_1=2$ [N]. The value of $\omega$ is 62.8 [1/s], where the natural angular frequency of the beam is $\approx 88$[1/s].

Three cases are shown, one with zero deflection, and two differently spatially harmonic vibrations.

(i) Zero deflection is illustrated in FIG. 6A, represented by d/l=0.
(ii) d/l=0.01 sin (3πx/l) sin (ωt), illustrated in FIG. 6B.
(iii) d/l=0.03 sin (2πx/l) sin (ωt), as illustrated in FIG. 6C.

Each time cycle is divided to four equal parts. The required deformation-field is marked by dashed lines and the deformation obtained by numerical computations is marked by solid lines. The results of the deformation field without compensation by the network is shown by the dotted lines. Good agreement is observed between the theoretic predictions and the numerical computations.

EXAMPLE

Reference is now made to FIGS. 7(a) to 7(i) which illustrates graphically an example of how the methods of the present application for designing and constructing composite solid-fluid structures with embedded channel networks are able to provide a load-supporting beam having rigidity substantially higher than that of a solid beam of the same dimensions. FIGS. 7(a) to 7(i) show an exemplary beam having a length of 1 m, a width of 0.05 m, and a height of 0.05 m. An uniform external load is applied on the upper surface. There are two separate channel networks (see FIG. 2C) where the upper network has a constant atmospheric pressure and the lower network is pressurized linearly by the external load, using a similar mechanism to that illustrated in FIG. 5B. The beams are clamped at one end, the right hand end of the drawings of FIG. 7(a) to 7(i), and are free to move at the other end.

Each row of the set of drawings shows the beams having a different load applied, 100 Pa for the first row, 200 Pa for the second row, and 300 Pa for the last row. Each column of the set of drawings shows a different beam construction, as follows:

Column 1 shows the deflections of a solid beam made of a flexible rubber material having a Young's modulus of only 10 Mpa, and a Poisson's ratio of 0.5.

Column 2 shows the deflections of a solid beam made of a substantially more rigid material than that of col. 1, having a Young's modulus one hundred times that of the rubber material of the first beam, i.e. 500 MPa.

Column 3 shows the deflections of a composite solid-fluid beam, constructed according to the methods of the present disclosure, and having two channel networks embedded within it.

The solid of the composite solid-fluid beam of col. 3 is the same flexible rubber material as that of the beam of col. 1, having a Young's modulus of only 10 MPa. However, as is observed from the drawings showing the calculated distortions, for all levels of load shown, the composite solid-fluid beam has a stiffness similar to that of the beam of col. 2, made of a material having a stiffness two orders of magnitude greater than that of the solid of the composite beam.

This example illustrates the effectiveness of the methods and structures of the present disclosure, using composite solid-fluid construction with an internal pressurized channel network. Such structures have substantially increased mechanical stiffness than would result from a simple structure using only the solid base material. The corollary of this example is that it is possible to construct composite solid-fluid structures of a given strength, but having substantially smaller sizes and hence lower weights than conventional structures made of the same materials. Such structures could thus be used in applications where weight is an important parameter of performance, such as for aerospace structures, lightweight wings, adjustably deformable wings, and the like.

As was stated hereinabove in the Summary section, the use of a fluid having high viscosity in the channels allows the limiting of an oscillating deformation to only part of the structure while keeping the rest of the structure essentially stationary. Reference is now made to FIGS. 8A and 8B which illustrate this effect on a beam structure such as that used in the above described examples.

An oscillating pressure is applied to the channel network at one end of the cantilever beam and the deflection along the beam and the pressure of the fluid in the channels is plotted as a function of the distance down the beam. In FIG. 8A, the deflection $D_s$ is shown as a function of the distance $Z_s$ along the beam, where the end $Z_s=0$ is clamped, and the end $Z_s=1$ is free. The pressure oscillations have a significantly smaller oscillation period (higher frequency) compared to the viscous elastic time scale, such that only part of the beam will deflect. In FIG. 8A, the pressure P is applied to the channels at the right hand side of the beam, $Z_s=1$, P(1, T)=P$_1$ sin(2π$\mathcal{F}_p$·T). The six curves show the amplitude of deflection at different times of the cycle of the oscillating pressure, which is divided into six equal parts. The length of the beam engaged in the oscillating motion can be controlled by varying the inlet frequency $\mathcal{F}_p$. Setting $\mathcal{F}_p=0.1$ and for pressure amplitude $P_1=0.02$, a beam deflection of $D_s\approx 0.006$ is obtained at $Z_s=1$, with the beam length deflection starting from $Z_s\geq 0.1$, as marked in by the dashed lines. Setting a much higher frequency, $\mathcal{F}_p=10$ and $P_1=1.5$ an identical beam deflection can be generated at the tip, $Z_s=1$, but this time with beam deflection starting only from $Z_s\geq 0.6$, as marked in by the solid lines. FIG. 8B shows the corresponding pressure profiles along the beam channels.

In addition to the effects shown in FIGS. 8A and 8B, deformation fields similar to standing waves and moving waves can be created for a given beam, without the need to create a new channel geometry for each deformation mode, simply by suitably modifying the pressure at the inlets. Reference is now made to FIGS. 9A and 9B, and 10A and 10B, which show an example of these features using the same beam geometry as that in FIGS. 8A and 8B. An oscillating pressure is introduced to inlets of the channel network at both ends, as a mechanism to create wave-like deformation fields. Matching frequency, amplitude, and phase angle of the applied oscillating pressures, it is possible to reproduce inertia-like standing and moving waves, in a system void of inertia and transport terms, by use of viscous effects alone.

Figures 9A, 9B:
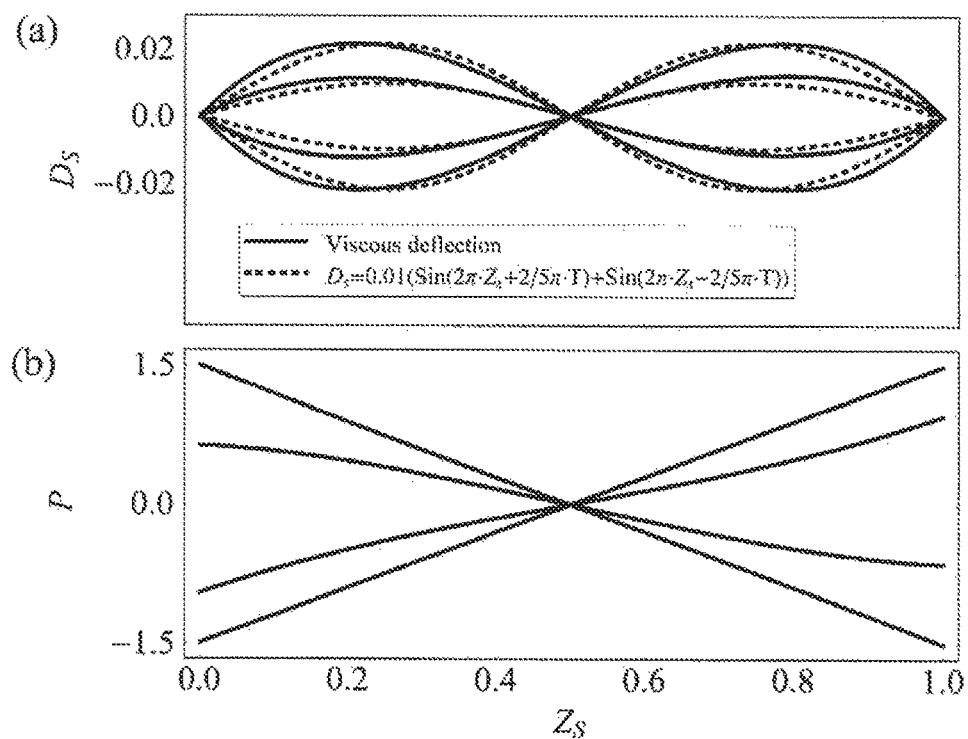

In FIGS. 9A and 9B, there is shown respectively the deflection $D_s$ (FIG. 9A) and pressure P (FIG. 9B) as a function of position down the beam length, $Z_s$ far a simply supported beam, hinged at $Z_s=0$ and at $Z_s=1$. Pressure is applied at both ends, given by:

$$P(0,T)=1.5 \cdot \sin(2\pi \cdot 0.2 \cdot T + \pi/2) \text{ and } P(1,T)=1.5 \cdot \sin(2\pi \cdot 0.2 \cdot T + 3\pi/2).$$

The viscous-elastic deformation field obtained, shown by the solid lines, closely follow an inertial standing wave of the form $$D_s(Z_s,T)=0.01(\sin(2\pi Z_s + 2\pi \cdot 0.2 \cdot T) + \sin(2\pi Z_s - 2\pi \cdot 0.2 \cdot T)),$$

as shown by the dashed lines in FIG. 9A, illustrating how such behavior can be obtained by simple choice of the applied pressure function to the channels. FIG. 9B shows the pressure profile down the beam length.

Figures 10A, 10B:
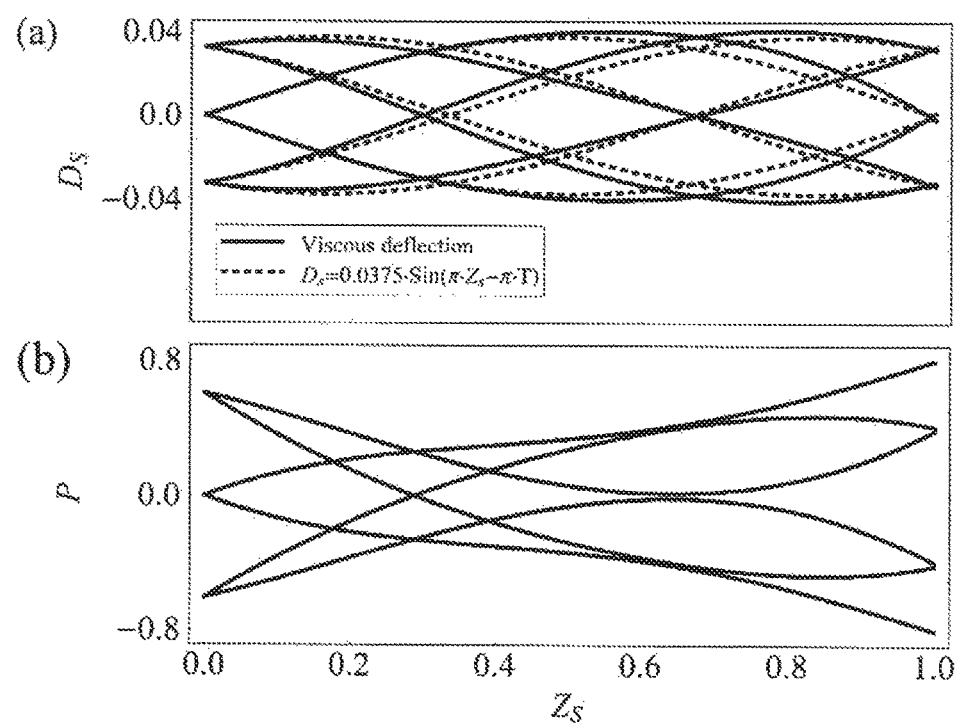

Reference is now made to FIGS. 10A and 10B which show the same beam as in the previous drawings, supported at $Z_s=0$ and free at the end $Z_s=1$, and set to oscillate as $$(D_s)|_{(0,T)}=-0.0375 \sin(2\pi \cdot 0.5 \cdot T) \text{ and}$$

$$(\partial D_s/\partial Z_s)|_{(0,T)}=2\pi \cdot 0.5 \cdot 0.0375 \cdot \cos(2\pi \cdot 0.5 \cdot T).$$

Pressure is introduced to inlets at both ends of the channel structure, as:

$$P(0,T)=0.7 \cdot \sin(2\pi \cdot 0.5 \cdot T + \pi) \text{ and } P(1,T)=0.8 \cdot \sin(2\pi \cdot 0.5 \cdot T + \pi/2).$$

In this case the deformation of the beam due to the viscous-elastic dynamics, as shown by the solid lines, closely matches that of an inertial moving wave given by $$D_s(Z_s,T)=0.0375 \cdot \sin(2\pi \cdot 0.5 \cdot Z_s - 2\pi \cdot 0.5 \cdot T),$$

as shown by the dashed lines.

FIG. 10B shows the corresponding pressure profile down the beam length.

These results thus illustrate some simple deflection forms enabled by the use of viscous fluids in the composite solid-fluid structures described in the present disclosure.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

The invention claimed is:

1. A structural element comprising:
 a base material having a predetermined stiffness; and
 a set of channels configured to be filled with fluid and embedded within said base material such that at least some of said channels are spatially asymmetric relative to the neutral plane of said structural element,
 wherein at least the positions of said set of channels within said base material, the dimensions of said set of channels and the pressure of the fluid within said channels are designated such that a deformation field generated by said pressure applied to said fluid within said set of channels is adapted to offset deformations caused to the element by the application of externally applied forces.

2. The structural element of claim 1 wherein at least some of said channels are located in a position offset from the midline of said element.

3. The structural element of claim 1 wherein the cross sectional geometric shapes of at least some of said set of channels are selected in determining said deformation field.

4. The structural element of claim 1 wherein said deformation field generated by said pressure applied to said fluid within said set of channels is determined by integration of the products of the channel density at points along said structural element with the geometric deflection generated by said pressure applied to said fluid in a single channel at said points along said structural element.

5. The structural element of claim 4 wherein said geometric deflection generated by said pressure applied to said fluid in a single channel at a point along said structural element, is determined as a function of at least:
 (i) the level of the pressure within said channel,
 (ii) Young's modulus of said material of said structural element,
 (iii) Poisson's ratio of said material of said structural element,
 (iv) the offset of said channel from the centerline of said structural element, and
 (v) the size of the channel relative to the dimension of said structural element in the direction of said deflection.

6. The structural element of claim 1, wherein said level of pressure is generated by a signal derived from the level of said externally applied force.

7. The structural element of claim 1, wherein said level of pressure is generated by direct application of said externally applied force to a piston generating said pressure.

8. The structural element of claim 1, wherein said pressure is changed dynamically such that the vibrational response of said element to time dependent applied forces is reduced.

9. The structural element of claim 1, wherein the effective stiffness of said structural element is higher than said predetermined stiffness of said base material when said pressure is applied to said fluid within said channels.

10. The structural element of claim 1, wherein said structural element is part of an aircraft wing, and said externally applied forces are aerodynamic forces operating on said wing.

11. A system for reducing the effect of deformation of a structural element by external forces, said system comprising:
 a structural element constructed according to claim 1;
 a sensing element actuated by said external forces; and
 a compressor generating the pressure for application to said fluid within said channels according to the output of said sensing element.

12. The system of claim 11 wherein said sensing element is a mechanical element actuated by said external forces and connected to a piston compressing said fluid within said channels.

13. A method of increasing the effective stiffness of a structural element, comprising:
- providing a base material constituting the basis of said structural element, said base material having embedded therein a set of channels containing a fluid, at least some of said channels being spatially asymmetric relative to the neutral plane of said structural element; and
- applying pressure to said fluid in accordance with the configuration of an external force field incident on said structural element,
- wherein at least the positions of said set of channels within said base material, the dimensions of said set of channels and the pressure of the fluid within said set of channels are configured so that a deformation field generated by said pressure is adapted to offset deformations that would be caused to said structural element by said externally applied force field, such that the effective stiffness of said structural element is increased.

14. The method of claim 13 wherein at least some of said channels are located in a position offset from the midline of said element.

15. The method of claim 13 wherein the cross sectional geometric shapes of at least some of said set of channels are suitably configured in determining said deformation field.

16. The method of claim 13 wherein said deformation field generated by said pressure applied to said fluid within said set of channels is determined by integration of the products of the channel density at points along said structural element with the geometric deflection generated by said pressure applied to said fluid in a single channel at said points along said structural element.

17. The method of claim 16 wherein said geometric deflection generated by said pressure applied to said fluid in a single channel at a point along said structural element, is determined as a function of at least:
  (i) the level of the pressure within said channel,
  (ii) Young's modulus of said material of said structural element,
  (iii) Poisson's ratio of said material of said structural element,
  (iv) the offset of said channel from the centerline of said structural element, and
  (v) the size of the channel relative to the dimension of said structural element in the direction of said deflection.

18. The method of claim 13 wherein the level of said pressure is generated by a signal derived from the level of said externally applied force field.

19. The method of claim 13 wherein the level of said pressure is generated by direct application of said externally applied force field to a piston generating said pressure.

20. The method of claim 13, further comprising changing said pressure dynamically such that the vibrational response of said element to time dependent applied forces is reduced.

21. The structural element of claim 1 wherein said fluid contained in said set of channels has a viscosity sufficiently high that the pressure within said set of channels varies spatially along said set of channels.

22. The method of claim 13, wherein said fluid contained in said set of channels has a viscosity sufficiently high that the pressure within said set of channels varies spatially along said set of channels.

* * * * *